United States Patent
Cheng

[11] Patent Number: 5,834,643
[45] Date of Patent: Nov. 10, 1998

[54] CAPACITIVE AUTO-SENSING MICRO-PROBE

[75] Inventor: Shih-Tung Cheng, Hsinchu, Taiwan

[73] Assignee: Industrial Technology Research Institute, Hsinchu, Taiwan

[21] Appl. No.: 726,715

[22] Filed: Oct. 7, 1996

[51] Int. Cl.$^6$ ........................................... G01B 5/28
[52] U.S. Cl. ........................................... 73/105
[58] Field of Search ................. 73/105; 250/306

[56] References Cited

U.S. PATENT DOCUMENTS

| | | | |
|---|---|---|---|
| 4,806,755 | 2/1989 | Duerig et al. | 250/306 |
| 5,085,070 | 2/1992 | Miller et al. | 73/105 |
| 5,307,693 | 5/1994 | Griffith et al. | 73/105 X |
| 5,338,932 | 8/1994 | Theodore et al. | 250/306 |

OTHER PUBLICATIONS

Brugger et al., "Microlever with Combined Intergrated Sensor/Actuator Functions for Scanning Force Microscopy", Sensors and Actuators A, vol. 43, 1994, pp. 339–345.

Joyce et al., "A New Force Sensor Incorporating Force–Feedback Control for Interfacial Force Microscopy", Rev. Sci. Instrum., vol. 62, No. 3, Mar. 1991, pp. 710–715.

*Primary Examiner*—Hezron E. Williams
*Assistant Examiner*—Daniel S. Larkin
*Attorney, Agent, or Firm*—W. Wayne Liauh

[57] ABSTRACT

The present invention discloses a capacitive-type auto-sensing micro-probe used in high-sensitivity sensor elements. The micro-probe is constructed by semiconductor process technology using solid forming methods to comprise the elements of a probe, a probe cantilever, capacitors, an interface circuit and a signal processing circuit etc. and is fabricated in a micro chip so as to reduce the volume of the system, shorten the distance of signal transmission, and elevate signal sensitivity. By employing capacitive-type sensing principles, the micro-probe establishes capacitive plates on the top of the micro-probe to position at the corresponding capacitive plates located beneath an sensing substrate, and as the probe approaches the sample, the interaction of the sample reacts to the probe to generate deformation signals which, in sequence, are converted into capacitive variation signals. The signals are amplified to derive the surface characteristics of the sample.

6 Claims, 8 Drawing Sheets

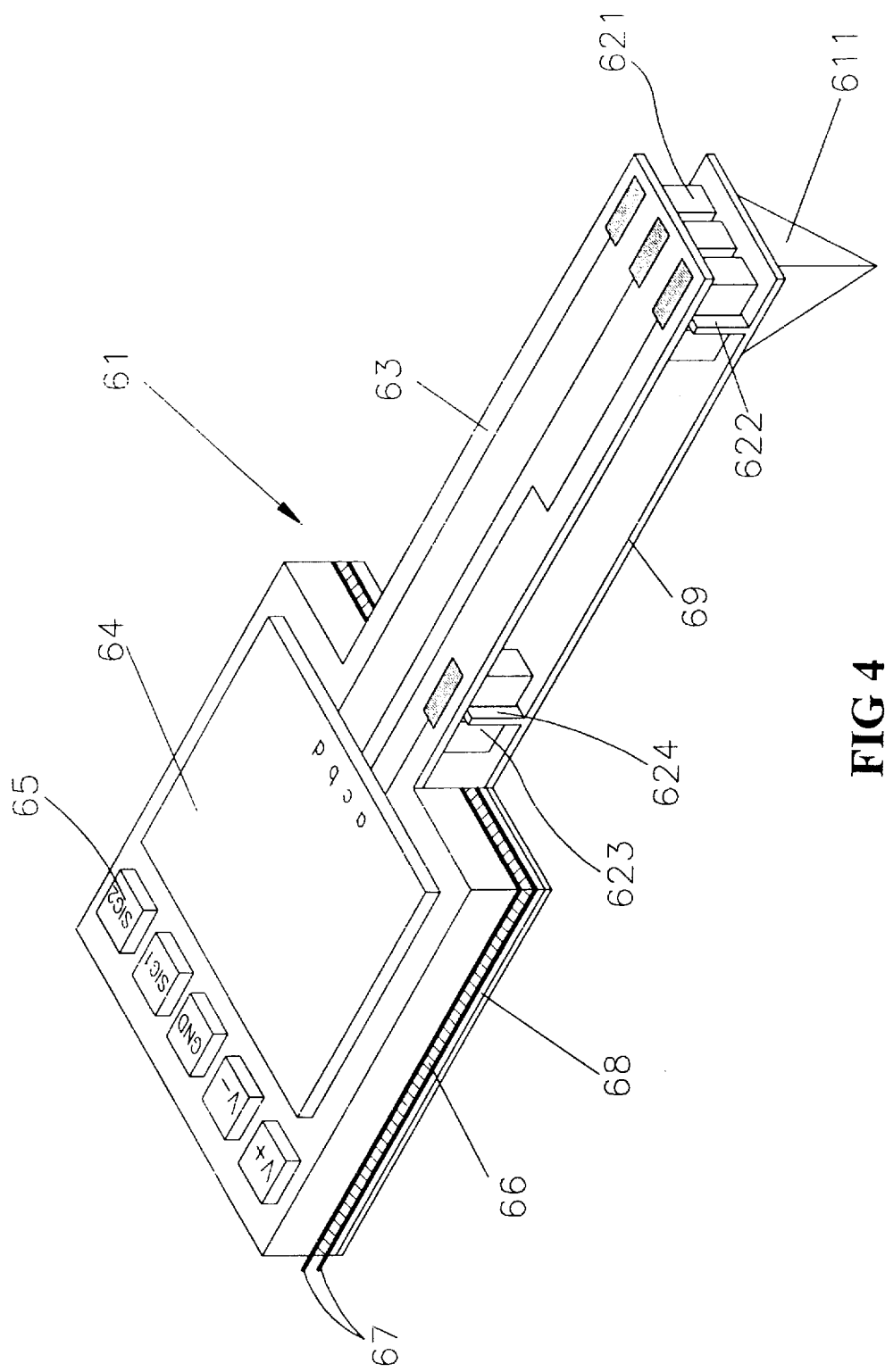

5,834,643

CAPACITIVE AUTO-SENSING MICRO-PROBE

FIELD OF INVENTION

The present invention discloses a capacitive type auto-sensing micro-probe, which is applied in the measurement of the displacement of the micro-probe by use of the capacitive sensing principle which installs capacitive plates between the probe's cantilever and the sensing substrate, and, after integrating the interface circuit and the probe system, it is fabricated to a micro-chip so that it can attain the object of reducing the volume, shortening the distance of signal transmission, elevating the signal sensitivity, cutting down the number of elements, reducing the space of operation, as well as lowering the cost.

BACKGROUND OF THE INVENTION

Ever since the invention of STM (Scanning Tunneling Microscopy), various kinds of scanning probe microscopy such as AFM (Atomic Force Microscopy), MFM (Magnetic Force Microscopy), SNOM (Scanning Near-Field Optical Microscopy), etc., are in full flourish. They are all of the kind of microscopy making use of a special microscopic probe to detect certain kinds of interaction, such as tunneling current, atomic force, magnetic force, scanning near-field electro-magnetic wave etc., between the probe and the surface of a sample, then, to make use of a piezo-electric ceramic scanner having displacements in three axes which makes the probe able to scan the surface of the sample in the front-and-rear as well as the left-and-right directions. It also utilizes the capability of minute adjustments in the vertical axis and the feedback circuit of this scanner to maintain a constant distance between the probe and the sample during the scanning process. Normally, it is a distance between several angstroms (A) to several hundred angstroms. One can obtain the equi-interaction chart of the sample's surface so long as one records the minute adjustment distance in vertical axis for each point on the scanned surface. These data can be used to derive the surface characteristics of the sample.

The probe, used in the Scanning Probe Microscope (SPM) of the prior art, will deform when subjected to the effects of surface roughness of the sample or other kinds of force during the scanning process, and it cannot automatically detect the deformation signal without using external optical systems to detect the deviation of the probe's cantilever. The probe makes use of the reflection of the laser beam to measure the minute action of the microscopic probe. The mode of operation is as follows: By use of a laser beam to focus on the probe, the laser beam reflects back to the photo sensor. Then the deformation of the probe, which is subjected to external forces, is measured by taking the signal measured from the photo sensor. In order to obtain the optimum amplified signal, one uses the variation of the reflection distance to project and amplify the deformation signal of the probe, hence the range of required space is relatively larger, and it is difficult to make a portable one. Also, this type of probe system needs a lot of elements including a probe, a laser diode, a reflex mirror, a focusing lens, a split laser sensor and a signal processing circuit etc., thus, this type of probe system has the disadvantages of being complicated in structure, high cost in optical elements, and not easy in operation.

SUMMARY OF THE INVENTION

The main object of the present invention is to provide a capacitive type auto-sensing micro-probe to measure the deformation on the microscopic probe by making use of a small capacitor on the top of the probe's cantilever and to directly transmit the obtained signal to an interface circuit at the rear end of a sensing substrate, thereby, to process and amplify without making use of optical elements to perform detection.

The second object of the present invention is to provide a high-sensitivity strain probe to perform signal amplification without making use of the reflex space distance so as to be able to greatly reduce the space of the probing system.

Another object of the present invention is to develop a capacitive type auto-sensing micro-probe that can cut down the number of elements, lower the cost, save time and possess high reliability. The present invention makes use of the integrated forming design of semi-conductors which can protect itself from affecting its accuracy due to the circuit error itself, noise, as well as external interference, thereby, it can greatly improve the reliability of the system, and does not need to adjust the laser beam and, therefore, can save time and is very convenient in usage.

One further object of the present invention is to show a capacitive type auto-sensing micro-probe that possesses the functions of temperature compensation and the ability of static and dynamic detections, and is able to detect deformation in different direction. By making use of a layout with capacitors in a front-and-rear direction, the present invention can detect the vertical deformation of the probe tip. Also, by making use of a layout with capacitors in a left-and-right direction, the present invention can detect the deformation of the probe tip in a twisting (left-and-right) direction. The present invention can also perform dynamic detection as the oscillator elements are subjected to electrical voltage.

For these reasons and in order to make your honor examiners further understand the structure and principle of the present invention, the authors herewith present a detailed and clear illustration together with the accompanied drawings:

BRIEF DESCRIPTION OF THE DRAWINGS AND THEIR COMPONENT NUMBERS

(A) DRAWINGS

FIG. 4 is the isometric view of the present invention.

(B) COMPONENT NUMBERS

1 The probe microscope of the prior art
10 Probe cantilever
11 Probe tip
12 Photo sensor
13 Laser reflex mirror -continued

| | |
|---|---|
| 14 | Laser focusing lens |
| 15 | Laser diode module |
| 20 | The sample |
| 30 | Piezo-electric driving device |
| 40 | Calculation and control unit |
| 50 | Analog/Digital signal converter |
| 60 | Substrate |
| 61 | Micro-probe |
| 611 | Probe tip |
| 621 | Capacitive plate |
| 622 | Capacitive plate |
| 623 | Capacitive plate |
| 624 | Capacitive plate |
| 63 | Sensing substrate |
| 64 | Interface circuit and signal processing circuit |
| 65 | Input/output connecting point |
| 66 | Oscillating element |
| 67 | Signal connecting point |
| 68 | Chip substrate |
| 69 | Probe cantilever |

DETAILED DESCRIPTION OF THE INVENTION

Figure 1:
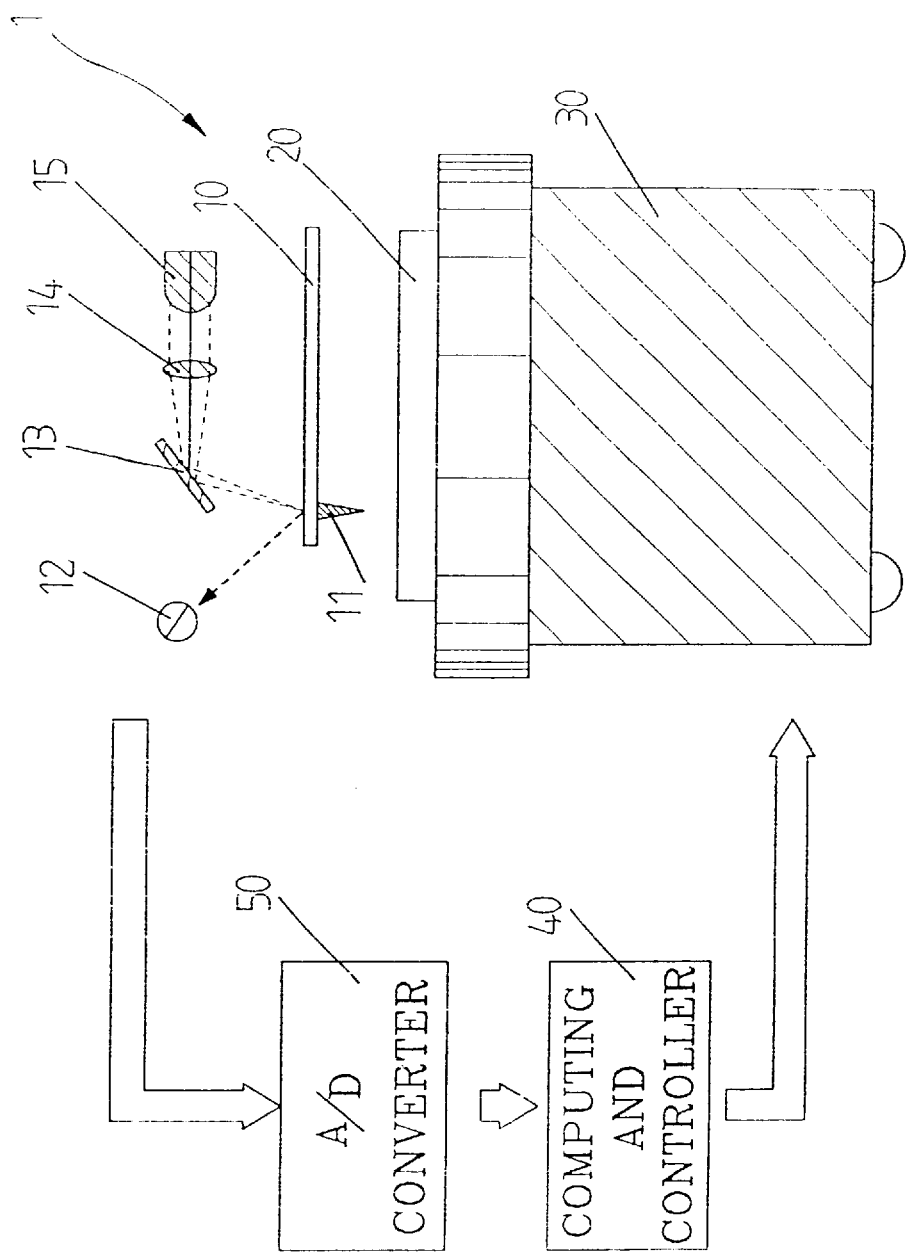
FIG. 1 is the block diagram of the probe type microscope of the prior art.

FIG. 1 is the block diagram of a probe type microscope of the prior art. The technical characteristics adopted is to calculate the surface roughness and accuracy of a sample by use of the principle of focus reflection of a laser beam through the reflection and amplification of the laser beam. The present invention makes use of a probe microscope 1 of the prior art to combine with a probe tip 11 to fix at a place. A laser emitting diode 15 emits a laser beam through a laser focusing lens 14, which focuses the laser beam onto the probe cantilever 10 at the back of microscopic probe tip 11 through reflection of the laser beam by the mirror 13. The deformation signal of the probe, generated from the interaction between the sample 20 and the probe tip 11 can be received by a laser sensor 12 to obtain a measuring signal which is sent back to a piezo-electric driving device 30 to perform accurate 3-axis displacement through an A/D signal converter 50 and a computing and controlling unit 40. This device has the following shortcomings:

1. To detect the deflection of the probe via the optical elements requires a lot of components, the cost of which is very high.
2. In order to amplify the deformation signal to obtain relatively accurate data, the microscope needs a lot more space to adjust the reflection distance of laser beam; therefore, the required space is large and it is difficult to create a microscope having a compact size.
3. The elements needed to construct a device of such nature are very complicated.
4. It takes time to adjust the laser beam and needs a professional staff to perform testing in order to obtain accurate data.
5. The measuring signal is apt to be affected by the environment, noise and circuit errors.

Figure 2:
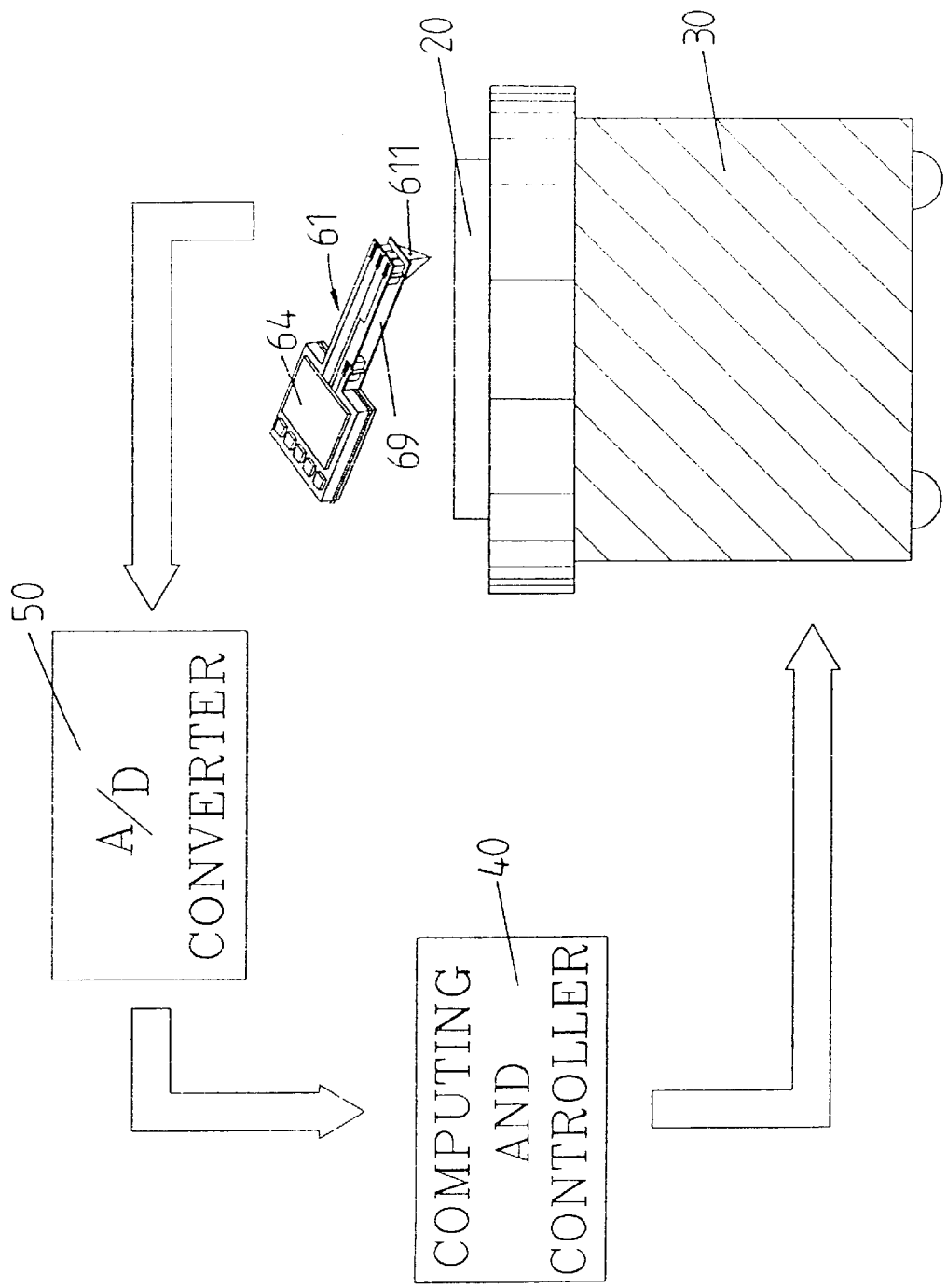
FIG. 2 is the block diagram of the probe system of the present invention.

FIG. 2 is the block diagram of a micro-probe system of the present invention. The present invention combines the probe system structure with the process technology of semiconductors to install pole plates, which possess capacitive characteristics, at both ends of a probe cantilever 69 to enable a deformation signal, which is detected by a micro-probe 61 on the probe cantilever 69, to be converted into a signal of capacitive variation After being processed by the A/D signal converter 50 as well as a computing and controlling unit 40, the signal is sent back to a piezo-electric driving device 30 to perform accurate 3-axis displacement. This kind of device has the following characteristics:

1. Components used are simple and the price is low.
2. The present invention can effectively save space since the present invention does not need to use the reflex space to perform signal amplification.
3. Easy to operate and comes in handy; even a non-professional person can operate the present invention.
4. The present invention does not need substantial amounts of time to adjust the laser beam which can effectively shorten the preparation time.
5. The present invention adopts semiconductor's processing to perform solid forming and its circuit is not interfered with by the noise.

Figure 3:
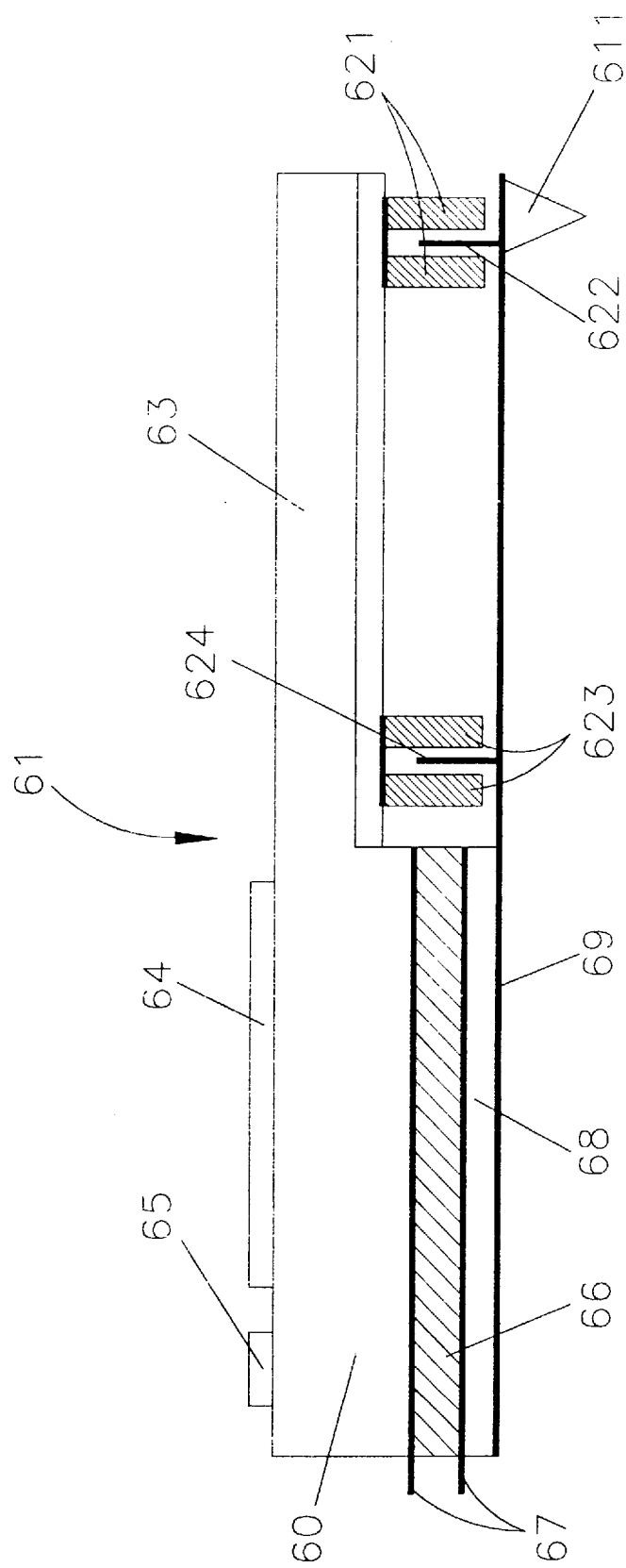
FIG. 3 is the structural section view of the present invention.

FIG. 3 is a structural section view of the present invention. Its overall profile shows a "T" shape which mainly consists of a semiconductor substrate 60 which extends externally in a transverse direction as a cantilever to become a capacitive sensing substrate 63 with pole plates i.e. capacitive plates 621 and 623, having capacitive characteristics, installed underneath at its both ends of the cantilevered section of the capcitive sensing substrate 63, i.e. at locations a and b. Using semiconductor processing technology, an interface circuit 64, an I/O connecting point 65, a signal connecting point 67, an oscillating element 66 and a chip substrate 68 are formed on the substrate 60 with the interface circuit 64 and the I/O connecting point 65 being formed on substrate's top layer. The oscillating element 66 (the function of which is to detect the displacement of the probe cantilever by use of the oscillation principle) is formed in the middle layer of the substrate 60 which also has two signal connecting points 67 extending from the oscillating element 66. The chip substrate 68 is formed at the bottom of the substrate 60. A probe cantilever 69 is formed as an extended part a in transverse direction of the chip substrate 68 which possesses capacitive plates 622 and 624 at locations corresponding to the capacitive plates on the capacitive sensing substrate 63 at a and b respectively, to form two capacitors. A probe tip 611 is formed at the end of the probe cantilever 69. As the substrate 60 approaches the sample, contact between the micro-probe 611 and the sample will generate a deformation of the cantilever 69 which is detected by the capacitors 621, 622, 623, 624. The capacitive signal is received by the interface circuit 64 to be processed and amplified into an electric signal. This electrical signal is sent to an AID signal converter 50 and a computing and controlling unit 40, through the I/O connecting point 65, to be processed, thereafter sent back to the piezo-electric driving device 30 (as shown in FIG. 2). Here, the piezo-electric system is a scanning system consisting of a set of piezo-electric transistor 3-axis positioner (not shown in the Figure), mainly to provide the functions of sample scanning and up-and-down motion while the piezo-electric driver is the power drive of the piezo-electric system that receives the output signal from the controller.

Figure 5A:
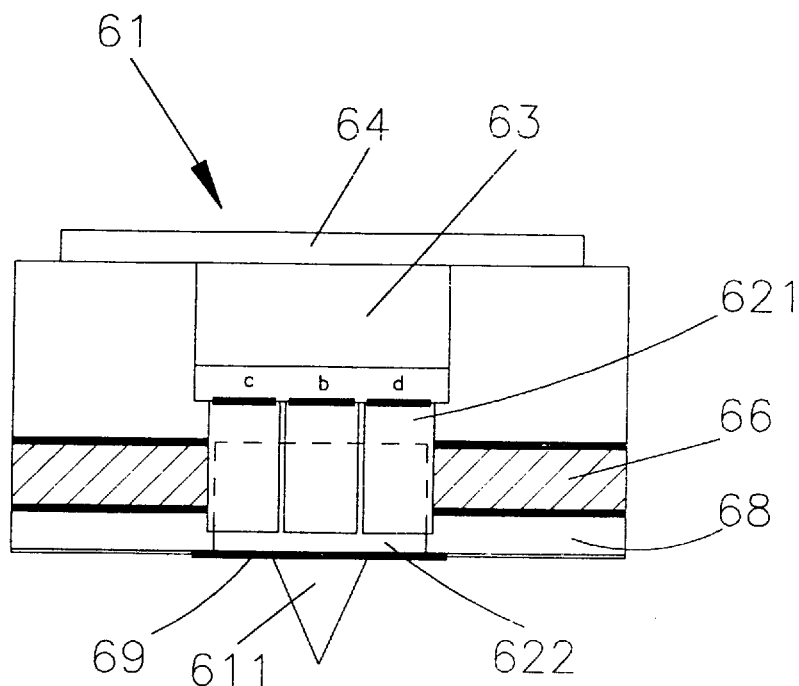
FIG. 5 is the front view of the present invention.
Figure 5B:
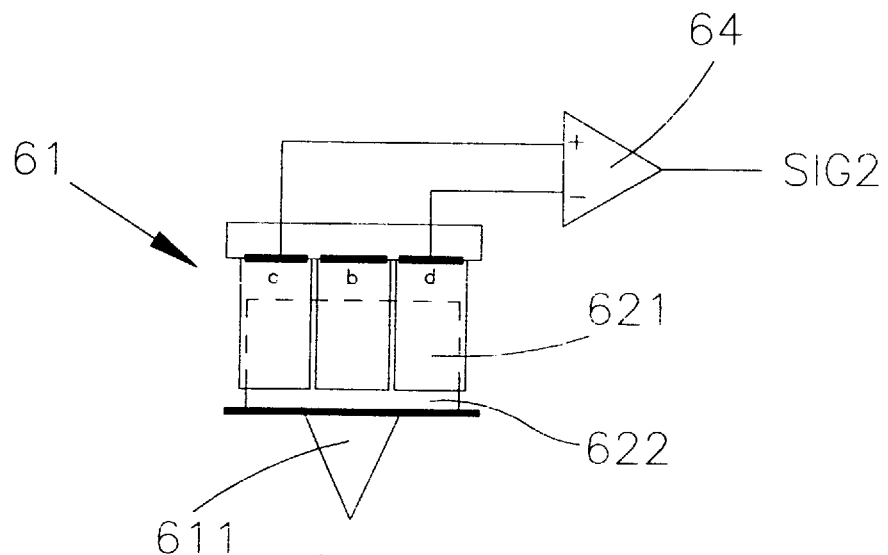

FIG. 4 is an isometric view of the present invention where there are three pieces, in the present embodiment, of capacitive plate 621 installed under the front end of the sensing substrate 63, among them the left and right hand capacitive plates are expressed by c and d respectively while the center one is expressed by b (compare with the ones shown in FIG. 5), also the capacitive plate 63 set up under the rear end of the sensing substrate 63 is expressed by a. It can be seen clearly from the drawing that the capacitive plates 622 and 624 are exactly placed in between the capacitive plates 621 and 623 respectively at the sensing substrate 63 to form capacitors. As the micro-probe 61 approaches the surface of the sample, the deformation action generated by the displacement of the probe tip 611 will be transferred to the probe's cantilever 69. The deformation action detected from the surface of the sample through the capacitive plates at a and b employs end a as a datum point which gives end b a relatively wider range of action, thereby, end b can detect the differential signal SIG1. Similarly, the capacitive plates c and d at the front end of the sensing substrate 63 can be used to detect the deformation action in the left-to-right direction to obtain another differential signal SIG2 (as shown in the lower one of FIG. 5). Therefore, the device of the present invention can attain the object of temperature compensation as well as detection of deformation in different directions.

Figure 6:
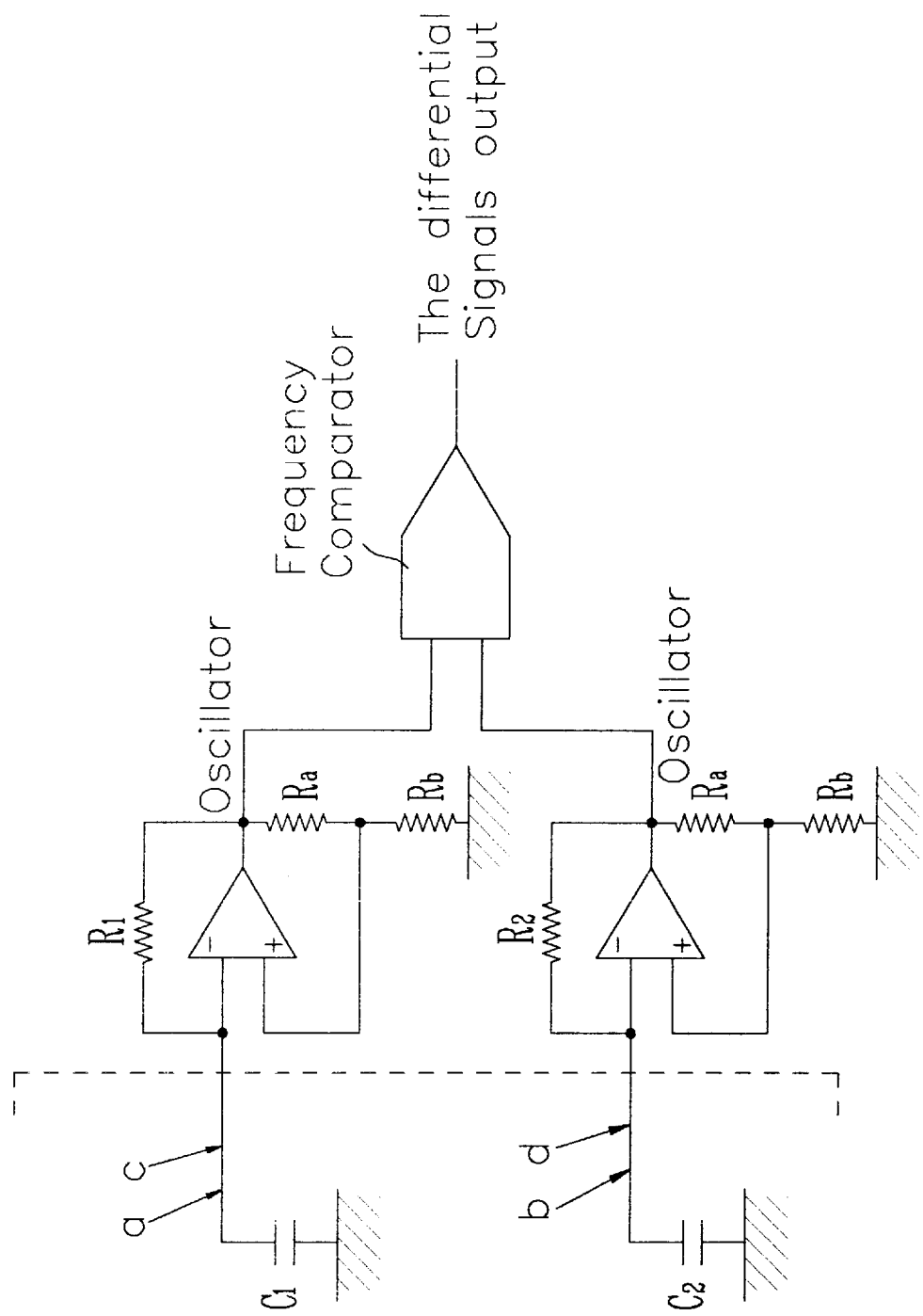
FIG. 6 is the dynamic detecting circuit diagram of the present invention.

FIG. 6 is a dynamic detecting circuit diagram of the present invention which employs the oscillating signals generated by the capacitors and, by comparing the difference of the oscillating frequencies, it detects the variation quantity of the capacitors. The advantage of this kind of circuit is that it is subject to relatively less interference from the capacitors' noise. The probe cantilever is driven to oscillate when the oscillating element is connected to the power source; the detected signals taken from point a and point b are sent through the oscillator then transported into the frequency comparator to be processed. The results obtained are the differential signal output of the detection in the up-and-down direction. Similarly, the detected signals taken from point c and point d are sent through the oscillator then transported into the frequency comparator to be processed; the results so obtained are the differential signal output of the detection in the left-and-right direction. Therefore, the device of the present invention can be applied in the case of dynamic detection which eliminates the shortcoming of measuring errors resulting from the oscillating elements which are normally added externally.

Figure 7:
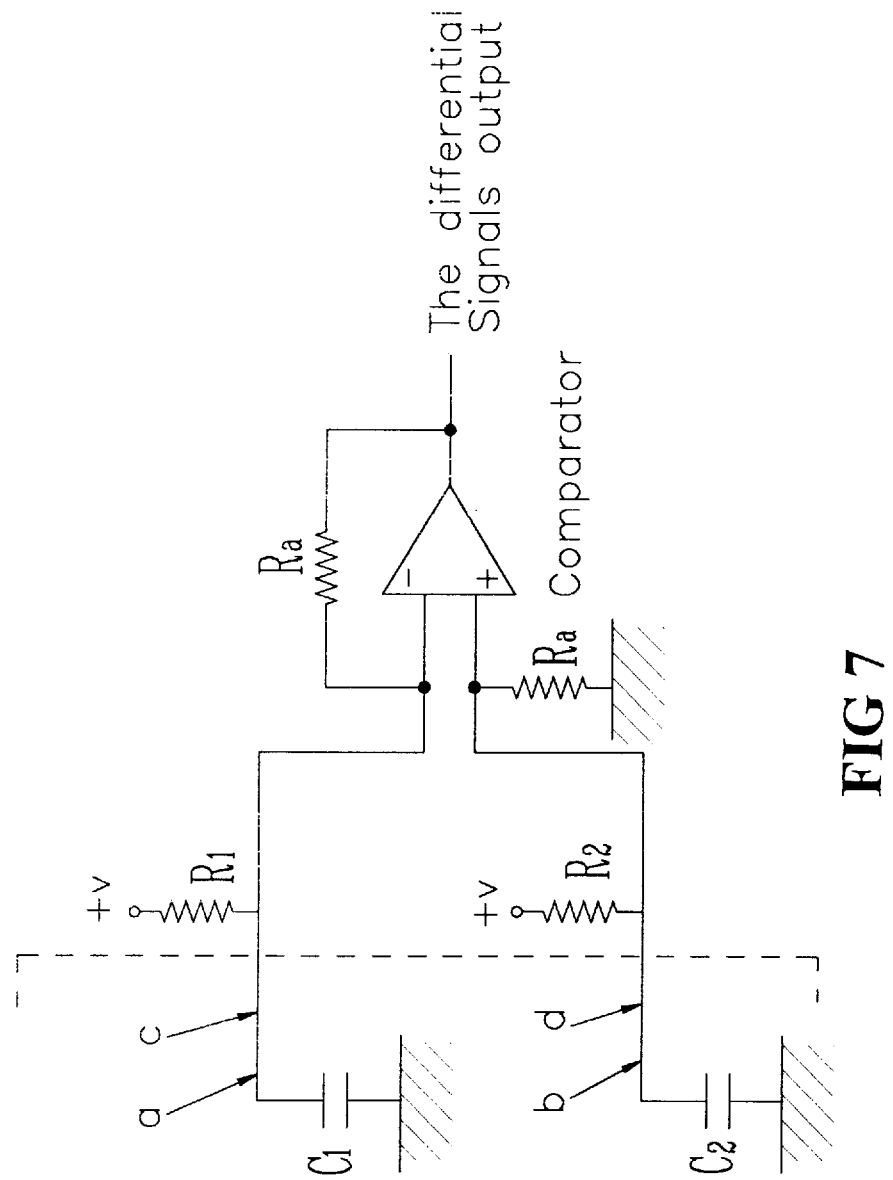
FIG. 7 is the static detecting circuit diagram of the present invention.

FIG. 7 is a static detecting circuit diagram of the present invention which employs the similar principle as mentioned above. It is a circuit mainly consisting of an RC circuit. The RC circuit eliminates need for the oscillator and employs the difference between capacitive and voltage values to generate differential signals so as to detect the variation of a capacitive value, the advantage being simple in circuit structure. The detected signals acquired from point a and point b respectively are transported into the comparator to be processed and the results obtained are the differential signals output detected in an up-and-down direction. Similarly, the detected signals acquired from point c and point d respectively are transported into the comparator to be processed and the results obtained are the differential signals output detected in a left-and-right direction. Therefore, the device of the present invention can be applied in the static detecting case which eliminates the shortcomings of measuring errors resulting from the optical elements added externally.

Figure 8:
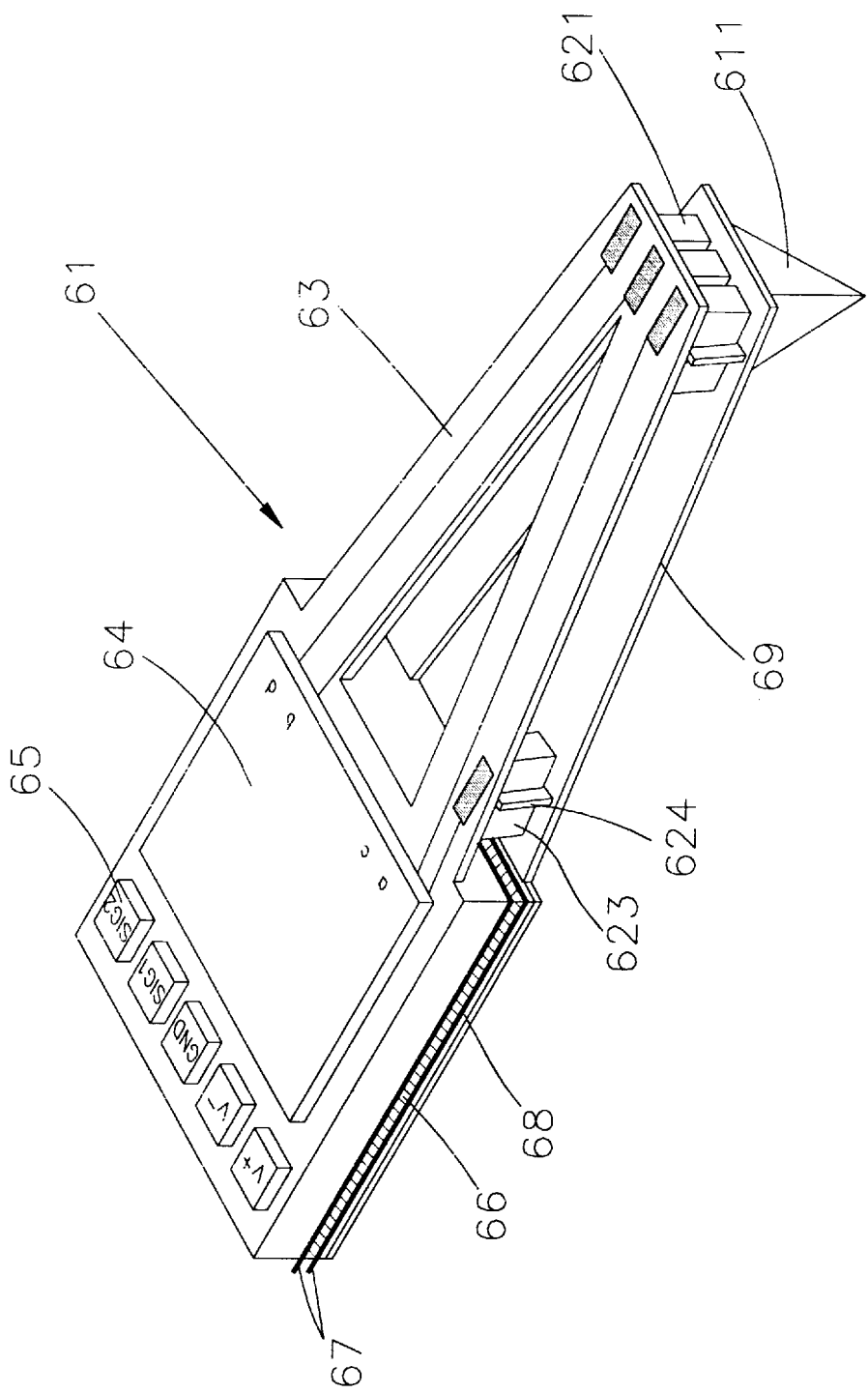
FIG. 8 is another embodiment of the present invention.

FIG. 8 is another embodiment of the present invention with its overall structure in the foregoing "T" shape except that the sensing substrate 63 shows a "V" shape to reinforce its structural strength such that it is not apt to break when the substrate is in use.

From the foregoing statements, the present invention is a high-sensitivity capacitive type auto-sensing micro-probe with high reliability and is a kind of design with great practical value that can cut down the number of elements, lower the cost, and save time. The present invention makes use of the design of solid forming of semiconductor which can protect its accuracy from being affected by its circuit errors, noise and external interference, thereby, greatly raising the system reliability without taking too much time on adjusting the laser beam which not only can save time but is also very convenient. The present invention can also be used in ultra-density memory devices as well as other sensors (such as micro-vibrating sensor, accelerating gauge, etc.) to effectively resolve the fact, which results in various inconvenience and shortcomings, that the conventional microscopic probe must use optical elements.

Although the present invention has been illustrated and described previously with reference to the preferred embodiments thereof, it should be appreciated that it is in no way limited to the details of such embodiments, but is capable of numerous modification within the scope of the appended claims.

What is claimed is:

1. A capacitive type auto-sensing micro-probe comprising:

a substrate which is constructed of semiconductor material wherein there are interface circuit connecting points and I/O connecting points set up on a top surface of the substrate, a piezo-electric oscillating piece and signal connecting points set up in a middle layer, and a chip substrate set up at the bottom of the substrate;

a sensing substrate which is an extended part protruded, at an appropriate length, from the upper edge of the substrate with capacitive plates formed on both the left hand and right hand side underneath the sensing substrate;

a probe cantilever which protrudes as a thin film from the bottom of the sensing substrate with capacitive plates formed both the left hand and right hand side of the probe cantilever; and a probe tip formed at an end of the probe cantilever wherein the above-mentioned elements are integrate-formed by semi-conductor processing; whereby the auto-sensing micro-probe converts minute deformation signals, which are generated by displacements of the probe tip, into capacitive signals through the capacitors formed by the capacitive plates from both the probe cantilever and the sensing substrate;

the auto-sensing micro-probe further comprises a signal processing circuit, which is connected to an A/D signal converter and a computing and controlling unit, then to a piezo-electric driving device, so as to form a high-sensitivity capacitive-type auto-sensing micro-probe.

2. The capacitive type auto-sensing micro-probe as claimed in claim 1 wherein the function of the interface circuit is to convert the capacitive signals into electric signals.

3. The capacitive type auto-sensing micro-probe as claimed in claim 1 wherein the capacitors at the front end of the probe cantilever are further separated into a capacitor at the left hand side of the probe cantilever and a capacitor at the right hand side of the probe cantilever to detect the deflections or signals generated by the twisting of the probe cantilever.

4. The capacitive type auto-sensing micro-probe as claimed in claim 1 wherein the probe is set up perpendicularly to the piezo-electric driving device.

5. The capacitive type auto-sensing micro-probe as claimed in claim 1 wherein the length of the probe cantilever is exactly equal to the length of the sensing substrate.

6. The capacitive type auto-sensing micro-probe as claimed in claim 1 wherein the said interface circuit comprise a capacitor/voltage signal converter, a filter, and a differential amplifier.

* * * * *